(12) United States Patent
Habara

(10) Patent No.: US 7,713,132 B2
(45) Date of Patent: May 11, 2010

(54) PROPELLER SHAFT

(75) Inventor: Yasuaki Habara, Haga-Gun (JP)

(73) Assignee: Showa Corporation, Gyoda-Shi (JP)

( * ) Notice: Subject to any disclaimer, the term of this patent is extended or adjusted under 35 U.S.C. 154(b) by 134 days.

(21) Appl. No.: 12/043,909

(22) Filed: Mar. 6, 2008

(65) Prior Publication Data

US 2009/0062023 A1 Mar. 5, 2009

(30) Foreign Application Priority Data

Aug. 29, 2007 (JP) ............... 2007-222960

(51) Int. Cl.
*F16C 3/00* (2006.01)
(52) U.S. Cl. .................. 464/180; 464/183; 464/126
(58) Field of Classification Search ............... 464/180, 464/183, 126; 188/378, 379
See application file for complete search history.

(56) References Cited

U.S. PATENT DOCUMENTS

| | | | | |
|---|---|---|---|---|
| 4,059,712 A * | 11/1977 | Bothwell | ............... | 428/34.6 |
| 4,844,193 A * | 7/1989 | Veselica et al. | ............... | 464/180 |
| 5,868,627 A * | 2/1999 | Stark et al. | ............... | 464/180 |
| 6,725,985 B2 * | 4/2004 | Haneishi et al. | ............... | 188/379 |
| 6,736,246 B2 * | 5/2004 | Haneishi et al. | ............... | 188/379 |
| 6,966,413 B2 * | 11/2005 | Haneishi et al. | ............... | 188/379 |
| 7,044,276 B2 * | 5/2006 | Haneishi et al. | ............... | 188/379 |
| 7,204,762 B2 * | 4/2007 | Campbell | ............... | 464/180 |
| 7,438,612 B2 * | 10/2008 | Wada et al. | ............... | 440/83 |
| 2003/0159899 A1 * | 8/2003 | Haneishi et al. | ............... | 188/379 |
| 2007/0072688 A1 * | 3/2007 | Dickson et al. | ............... | 464/180 |
| 2007/0099713 A1 * | 5/2007 | Campbell et al. | ............... | 464/180 |
| 2007/0144852 A1 * | 6/2007 | Furuya | ............... | 188/379 |
| 2008/0182672 A1 * | 7/2008 | Toita | ............... | 464/180 |

FOREIGN PATENT DOCUMENTS

| | | |
|---|---|---|
| JP | 2001-12446 | 1/2001 |
| JP | 3753191 | 12/2005 |
| JP | 3544579 | 6/2008 |

* cited by examiner

*Primary Examiner*—Aaron M Dunwoody
(74) *Attorney, Agent, or Firm*—Babcock IP, PLLC

(57) ABSTRACT

A propeller shaft with a dynamic damper and a tubular wound paper damper in an inner portion of the propeller shaft. The dynamic damper provided with a ring member at an outer side in a diametrical direction and a weight member elastically retained in an inner side in the diametrical direction of the ring member. The paper damper has an outer paper portion positioned in the outer side in the diametrical direction and an inner paper portion positioned in the inner side in the diametrical direction. The outer paper portion extending to the dynamic damper farther than said inner paper portion, contacting the ring member, thus inhibiting the inner paper portion from coming into contact with the weight member.

8 Claims, 5 Drawing Sheets

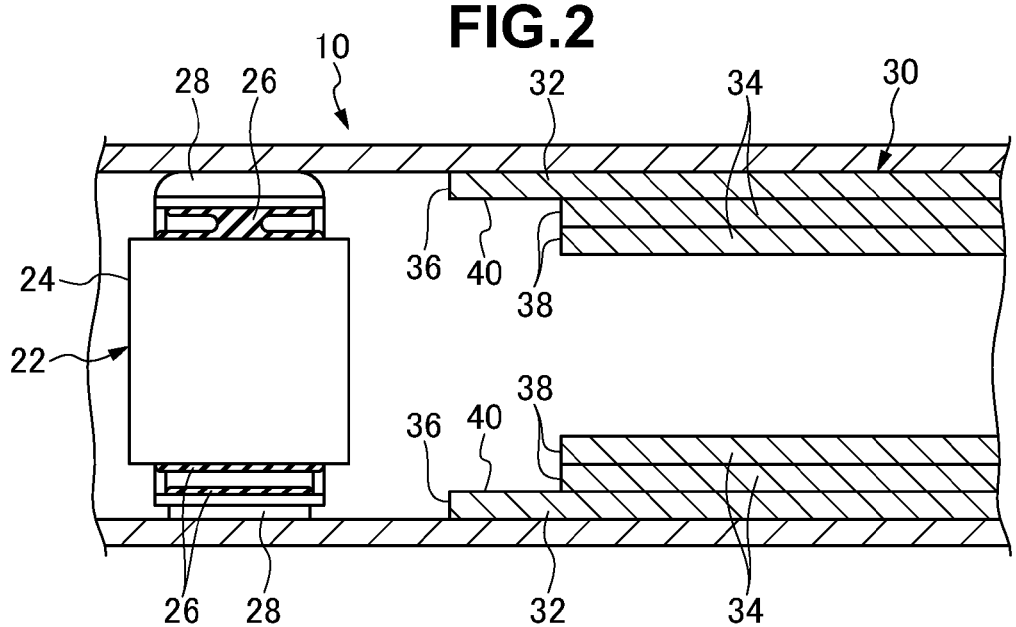
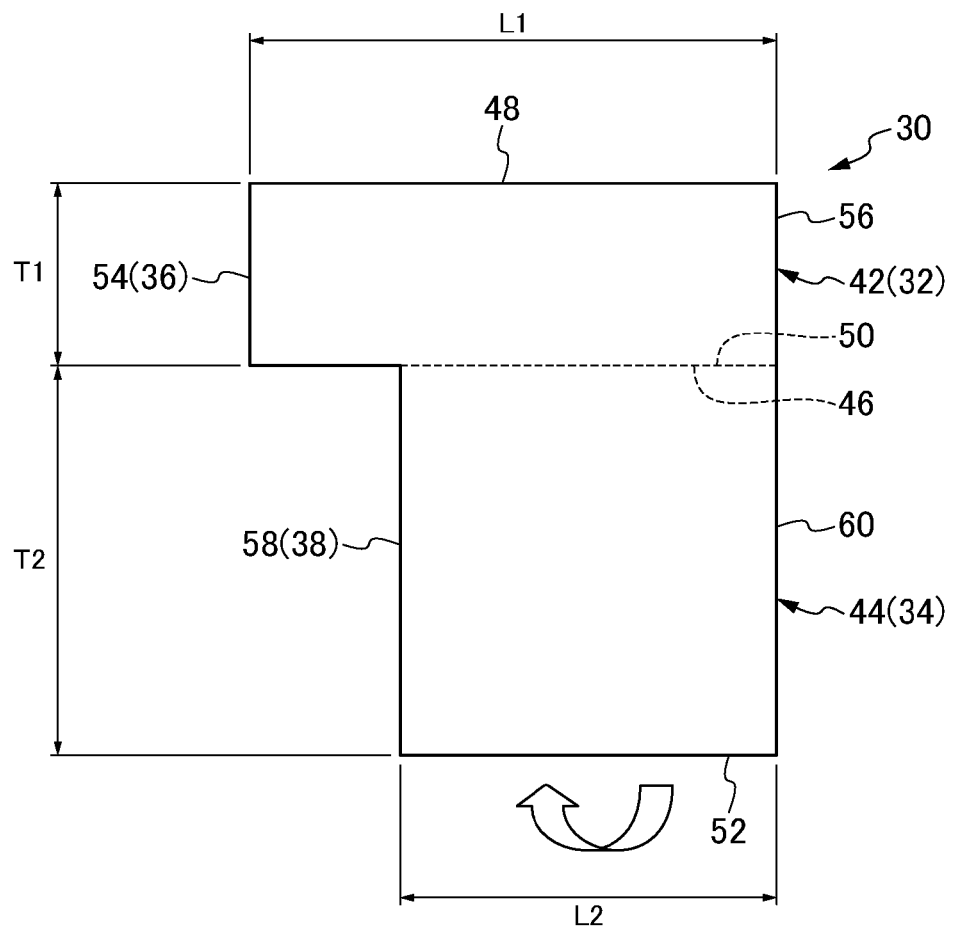

PROPELLER SHAFT

BACKGROUND OF THE INVENTION

1. Field of the Invention

The present invention relates to a propeller shaft used in a vehicle such as a motor vehicle or the like, and more particularly to a propeller shaft provided with a dynamic damper and a paper damper in an inner portion.

2. Description of the Related Art

As shown in FIG. 7, there has been conventionally known a propeller shaft 100 structured such that a dynamic damper 102 and a paper damper 104 are provided in an inner portion (for example as disclosed in patent document 1). In other words, an output of an internal combustion engine mounted to a front portion of a vehicle is generally transmitted to a drive wheel in a rear side by the propeller shaft 100 via a transmission, however, since a characteristic of the propeller shaft 100 exerts a great influence on a vibration of the vehicle, it is possible to improve a vibration characteristic of the propeller shaft 100 by installing the dynamic damper 102 to a cylinder inner portion of the propeller shaft 100 and attenuating a vibration by the dynamic damper 102.

Further, a stuffy sound is generated at a time of a rotation of the propeller shaft 100, however, it is possible to reduce or vanish the stuffy sound by setting the paper damper 104 in the inner portion of the propeller shaft 100. In this case, as shown in FIG. 8, the paper damper 104 is formed as an approximately rectangular shape in a plan view in a state of being expanded, and is inserted to the inner portion of the propeller shaft 100 in a state of being wound in a tubular shape (for example as disclosed in patent document 2).

(Patent Document 1) Japanese Patent Application Laid-open No. 2001-12446
(Patent Document 2) Japanese Patent No. 3544579
(Patent Document 3) Japanese Patent No. 3753191

However, in the structure in which the dynamic damper and the paper damper are provided in the inner portion of the propeller shaft, a part (a weight portion or the like) of the dynamic damper may come into contact with the paper damper at a time of simultaneously inserting the dynamic damper and the paper damper to the inner portion of the propeller shaft. If the weight member of the dynamic damper comes into contact with the paper damper, a frequency characteristic of the dynamic damper is changed. Accordingly, the function of the dynamic damper is compromised.

In general, the dynamic damper is constituted by a ring-like member positioned in an outer side in a diametrical direction, and a weight member positioned in an inner side in the radial direction of the ring-like member. One method of avoiding a contact between the weight member and the paper damper is intentionally elongating a length in an axial direction of the ring-like member. However, if the length in the axial direction of the ring-like member is elongated, the dynamic damper is enlarged in size so as to increase its weight, and there is generated the other problem that a manufacturing cost is increased.

SUMMARY OF THE INVENTION

Accordingly, the present invention provides a propeller shaft which can prevent a manufacturing cost from being increased, and can easily prevent a paper damper from coming into contact with a weight member of a dynamic damper.

The present invention relates to a propeller shaft accommodating a dynamic damper and a tubular wound paper damper in an inner portion of a shaft member. The dynamic damper has a ring-like member positioned in an outer side in a diametrical direction, and a weight member positioned in an inner side in the diametrical direction of the ring-like member so as to be elastically retained. The paper damper has an outer paper portion positioned in the outer side in the diametrical direction and an inner paper portion positioned in the inner side in the diametrical direction of the outer paper portion, in a state of being accommodated in the shaft member. The outer paper portion is dimensioned longer so as to extend to the dynamic damper side farther than the inner paper portion. Thereby, the outer paper portion comes into contact with the ring-like member, whereby the inner paper portion is inhibited from coming into contact with the weight member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 2 is a cross sectional view obtained by cutting a layout structure of a dynamic damper and a paper damper of the propeller shaft in accordance with the embodiment of the present invention along an axial direction;

FIG. 3 is a plan view showing a state of expanding the paper damper accommodated in the propeller shaft in accordance with the embodiment of the present invention;

DESCRIPTION OF THE PREFERRED EMBODIMENTS

Figure 1:
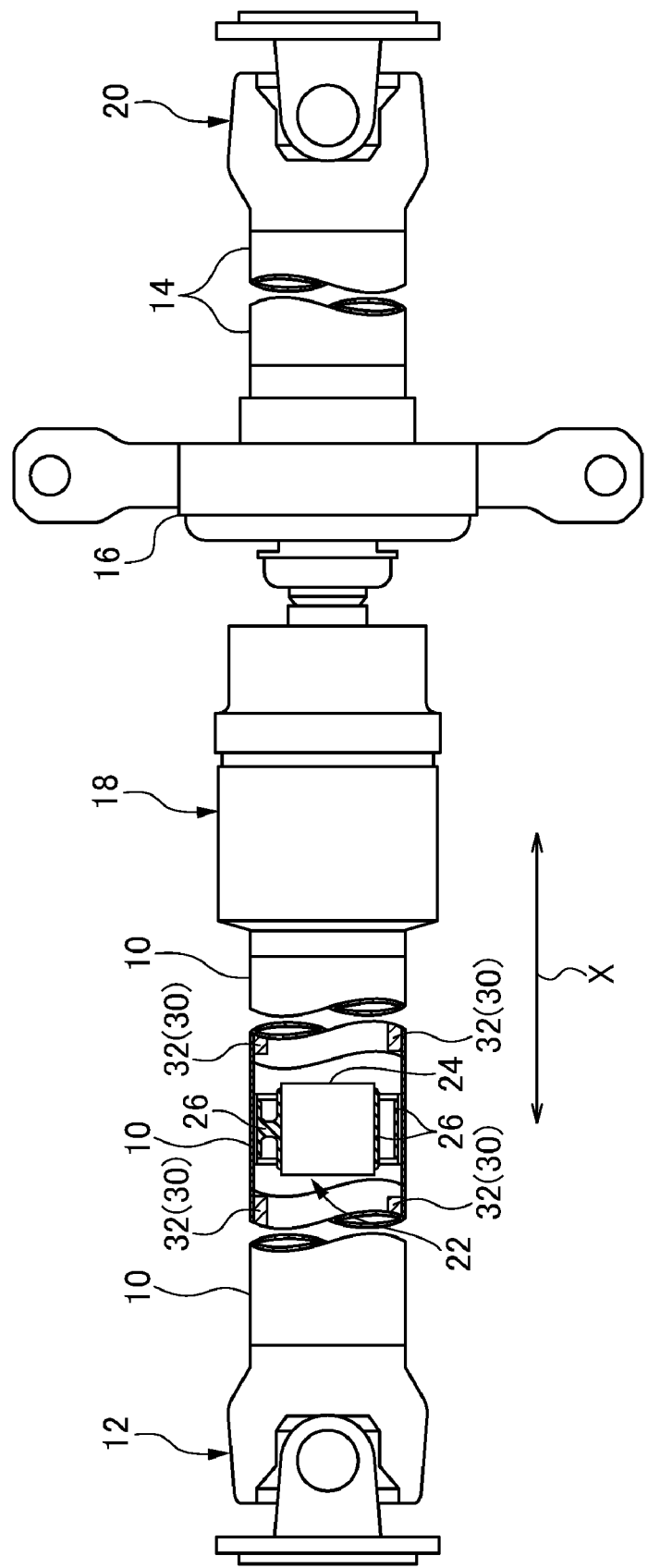
FIG. 1 is a partial side elevational view showing a propeller shaft in accordance with an embodiment of the present invention in a partly omitted manner.

Next, a description will be given of a propeller shaft in accordance with an embodiment of the present invention with reference to the accompanying drawings. FIG. 1 shows a part of a power transmission mechanism of a vehicle, and shows a state in which a first propeller shaft and a second propeller shaft are coupled in a partly omitted manner.

As shown in FIG. 1, a front end of a first propeller shaft 10 (a shaft member) is coupled to an output side of an internal combustion engine via a cross joint 12. A second propeller shaft 14 is structured such that a front portion elastically supported in the manner of being rotatable to a ring-shaped bearing support 16 is coupled to the first propeller shaft 10 by a tripod type constant velocity universal joint 18. Further, a rear end of the second propeller shaft 14 is coupled to a power transmission member in the next stage via a cross joint 20.

As shown in FIGS. 1 and 2, a dynamic damper 22 is installed to an inner portion of the first propeller shaft 10. The dynamic damper 22 is constituted by a cylindrical outer ring member 28 (not shown in FIG. 1), a columnar inner weight (weight member) 24 positioned in an inner side in a diametrical direction of the outer ring member (ring-like member) 28, and a rubber member 26 coupling both the elements. The dynamic damper 22 is installed to a predetermined position of the first propeller shaft 10 by being pressure inserted to the inner portion of the first propeller shaft 10. In this case, since a structure of the dynamic damper 22 is disclosed in detail in the patent document 3 mentioned above, a description thereof will be omitted.

Further, as shown in FIG. 2, paper dampers 30 are installed to positions in both sides in an axial direction (a direction of an arrow X in FIG. 1) with respect to the dynamic damper 22 in the inner portion of the first propeller shaft 10. The paper damper 30 is accommodated in an inner portion of the first propeller shaft 10 in a state of being wound cylindrically. The paper damper 30 has an outer paper portion 32 positioned in an outer side in a diametrical direction in a state in which the paper damper 30 is accommodated in the inner portion of the first propeller shaft 10, and an inner paper portion 34 positioned in an inner side in the diametrical direction of the outer paper portion 32. In this case, a length in an axial direction of the outer paper portion 32 is set such as to be longer than a length in the axial direction of the inner paper portion 34, and a structure is particularly made such that a dynamic damper side end portion 36 of the outer paper portion 32 extends so as to protrude to an outer side in the axial direction farther than a dynamic side end portion 38 of the inner paper portion 34. In other words, the inner paper portion 34 is structured such as to be concaved to an inner side in the axial direction from the outer paper portion 32, and a step portion 40 is formed in an outer side of an end portion in the axial direction of the inner paper portion 34 in an inner side in the diametrical direction of the outer paper portion 32.

In this case, a description will be given of a detailed shape of the paper damper 30.

As shown in FIG. 3, the paper damper 30 has an outer rectangular portion 42 constructing the outer paper portion 32 and formed rectangular as a whole in a plan view in a state of expanding the paper damper 30, and an inner rectangular portion 44 constructing the inner paper portion 34 and integrally formed continuously with the outer rectangular portion 42 in a plan view in a state of expanding the paper damper 30 and formed rectangular as a whole.

Further, a dimension T1 and a dimension T2 are set such as to be integral multiples of an inner peripheral length of the first propeller shaft 10, in which the dimension T1 is a dimension from a one side end portion 46 of the outer rectangular portion 42 positioned close to the inner rectangular portion 44 to the other side end portion 48 opposing to the one side end portion 46, and the dimension T2 is a dimension from a one side end portion 50 of the inner rectangular portion 44 positioned close to the outer rectangular portion 42 to the other side end portion 52 opposing to the one side end portion 50. Particularly, the present embodiment sets the dimension T1 from the one side end portion 46 of the outer rectangular portion 42 positioned close to the inner rectangular portion 44 to the other side end portion 48 opposing to the one side end portion 46 equal to a circumferential length of the first propeller shaft 10, and sets the dimension T2 from the one side end portion 50 of the inner rectangular portion 44 positioned close to the outer rectangular portion 42 to the other side end portion 52 opposing to the one side end portion 50 approximately twofold of the inner peripheral length of the first propeller shaft 10.

Further, a dimension L1 from a one side end portion 54 in the axial direction of the outer rectangular portion 42 to the other side end portion 56 in the axial direction is set to be longer than a dimension L2 from a one side end portion 58 in the axial direction of the inner rectangular portion 44 to the other side end portion 60 in the axial direction.

In this case, the paper damper 30 is wound from the other side end portion 52 of the inner rectangular portion 44. In other words, the other side end portion 52 of the inner rectangular portion 44 comes to a center of the winding, and the paper damper 30 is laminated toward an outer side in a diametrical direction from the inner rectangular portion 44 to the outer rectangular portion 42.

Accordingly, if it is set such that the dimension T1 from the one side end portion 46 of the outer rectangular portion 42 positioned close to the inner rectangular portion 44 to the other side end portion 48 opposing to the one side end portion 46 is equal to the inner circumferential length of the first propeller shaft 10, and the dimension T2 from the one side end portion 50 of the inner rectangular portion 44 positioned close to the outer rectangular portion 42 to the other side end portion 52 opposing to the one side end portion 50 is twofold of the inner peripheral length of the first propeller shaft 10, the outer paper portion 32 is wound one layer along the diametrical direction, and the inner paper portion 34 is wound two layers along the diametrical direction, as shown in FIG. 2.

In this case, the paper damper 30 is constructed by a cardboard such as a core paper of a corrugated board or the like.

Next, a description will be given of an operation of the propeller shaft in accordance with the first embodiment.

Figure 4:
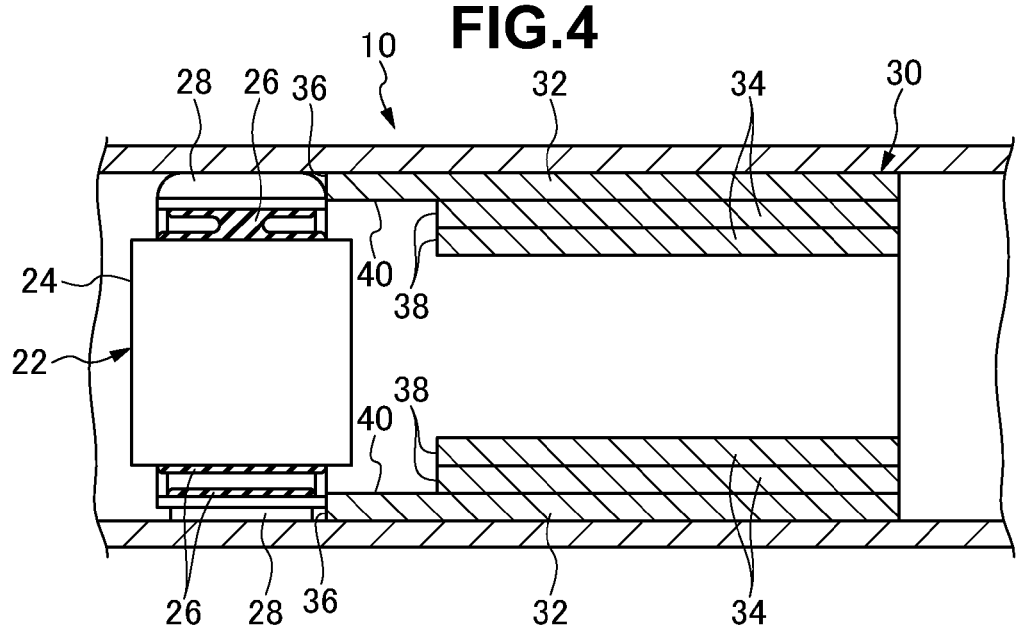
FIG. 4 is a cross sectional view obtained by cutting a state in which the paper damper of the propeller shaft in accordance with the embodiment of the present invention comes into contact with the dynamic damper side along the axial direction.

As shown in FIGS. 2 and 4, when the paper damper 30 comes into contact with the dynamic damper 22, the outer paper portion 32 of the paper damper 30 is first brought into contact with the outer ring member 28 of the dynamic damper 22. At this time, since the outer paper portion 32 protrudes to the dynamic damper 22 side than the inner paper portion 34, the inner paper portion 34 of the paper damper 30 does not come into contact with the inner weight 24 of the dynamic damper 22 in a state in which the outer paper portion 32 is in advance brought into contact with the outer ring member 28 of the dynamic damper 22. In this case, the outer paper portion 32 comes into contact only with the outer ring member 28 of the dynamic damper 22, and does not come into contact with the inner weight 24. Accordingly, it is possible to prevent the outer paper portion 32 and the inner paper portion 34 of the paper damper 30 from coming into contact with the inner weight 24 of the dynamic damper 22. As a result, it is possible to prevent the paper damper 30 from adversely affecting the frequency characteristic of the dynamic damper 22.

Particularly, since it is not necessary to make the length in the axial direction of the outer ring member 28 specially longer than the inner weight 24 for inhibiting the inner paper portion 34 of the paper damper 30 from coming into contact with the inner weight 24 of the dynamic damper 22, it is possible to make the dynamic damper 22 compact and light and it is possible to prevent a manufacturing cost from being increased.

Further, it is set such that the dimension T1 from the one side end portion 46 of the outer rectangular portion 42 positioned close to the inner rectangular portion 44 to the other side end portion 48 opposing to the one side end portion 46 is equal to the inner circumferential length of the first propeller shaft 10, and the dimension T2 from the one side end portion 50 of the inner rectangular portion 44 positioned close to the outer rectangular portion 42 to the other side end portion 52 opposing to the one side end portion 50 is approximately twofold of the peripheral length of the first propeller shaft 10. A mass in a circumferential direction in each of the positions of the paper damper 30 installed in the first propeller shaft 10 becomes constant by setting the dimension T1 from the one side end portion 46 of the outer rectangular portion 42 positioned close to the inner rectangular portion 44 to the other side end portion 48 opposing to the one side end portion 46, and the dimension T2 from the one side end portion 50 of the inner rectangular portion 44 positioned close to the outer rectangular portion 42 to the other side end portion 52 opposing to the one side end portion 50 integral multiples such as one-fold, twofold or the like of the inner peripheral length of the first propeller shaft 10, as mentioned above. Accordingly, since a dispersion of the mass (a mass unbalance) is not generated by accommodating the paper damper 30 in the first propeller shaft 10, it is possible to improve a sound damping performance of a stuffy sound generated by the paper damper 30 as well as it is possible to prevent from adversely affecting the frequency characteristic of the dynamic damper 22 on the basis of an installation of the paper damper 30.

In this case, a description will be given of a modified embodiment of the paper damper 30.

Figure 5:
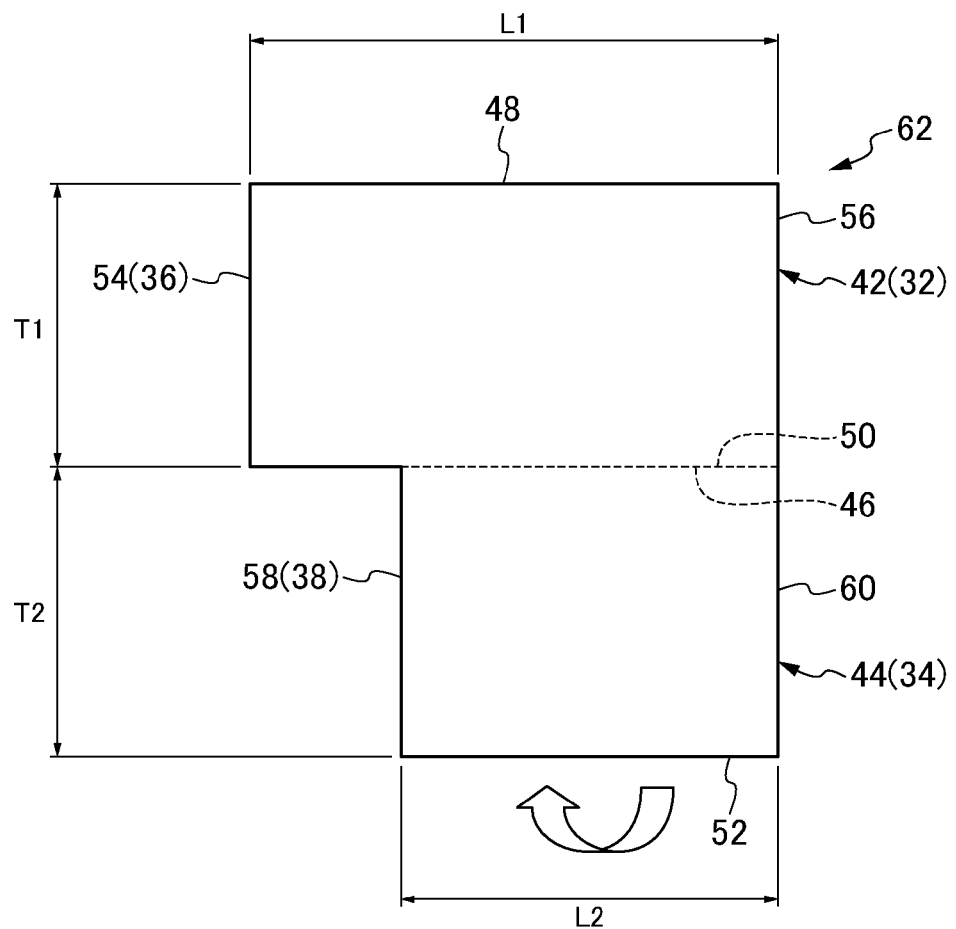
FIG. 5 shows a modified embodiment of the paper damper accommodated in the propeller shaft in accordance with the embodiment of the present invention, and a plan view showing a state in which the paper damper is wound from an inner paper portion.
Figure 6:
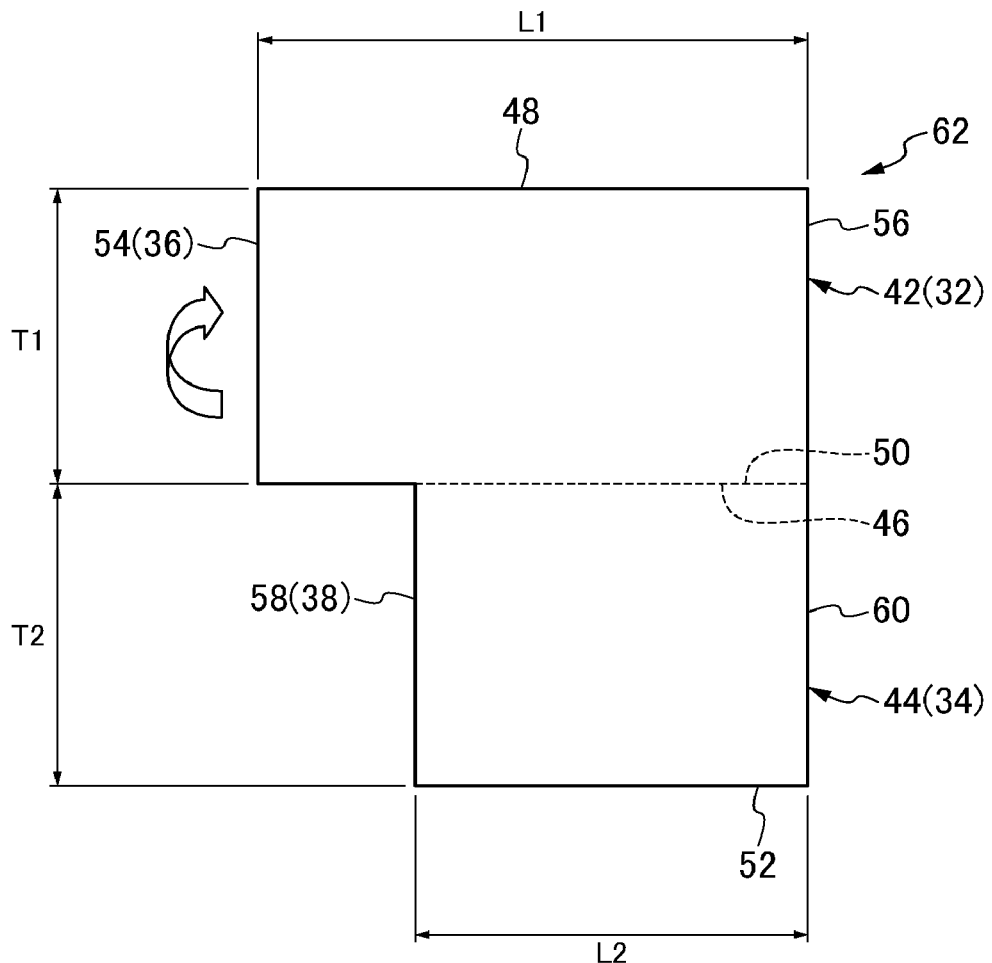
FIG. 6 shows a modified embodiment of the paper damper accommodated in the propeller shaft in accordance with the embodiment of the present invention, and a plan view showing a state in which the paper damper is wound from an outer paper portion.
Figure 7:
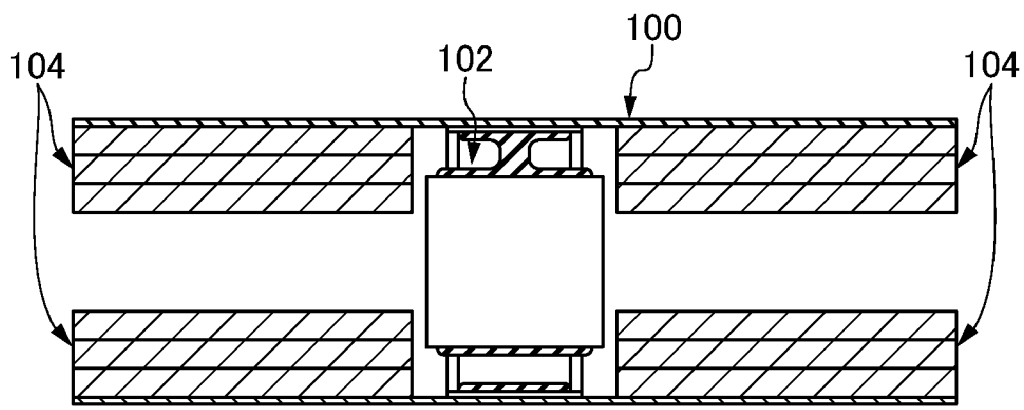
FIG. 7 is a cross sectional view obtained by cutting a layout structure of a dynamic damper and a paper damper of a conventional propeller shaft along an axial direction.
Figure 8:
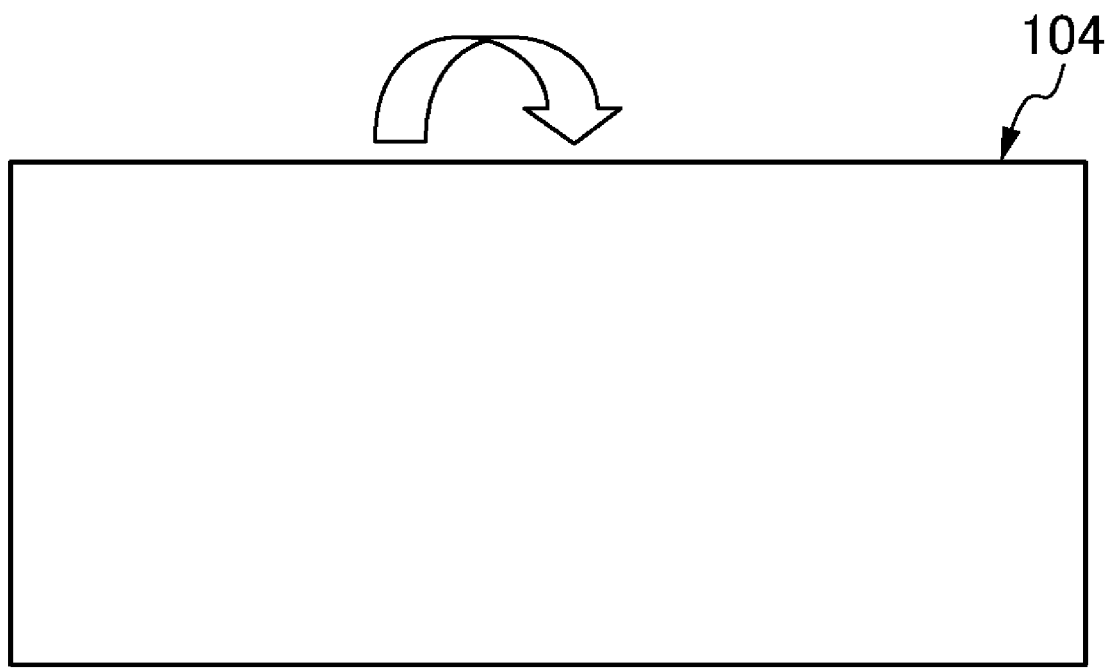
FIG. 8 is a plan view showing a state of expanding the paper damper accommodated in the conventional propeller shaft.

In this case, in FIGS. 5 and 6, the same reference numerals are attached to lapping structures (portions) over the structures (the positions) of the paper damper 30 in accordance with the embodiment mentioned above.

As shown in FIGS. 5 and 6, a paper damper 62 in accordance with the modified embodiment is set such that the dimension T1 from the one side end portion 46 of the outer rectangular portion 42 positioned close to the inner rectangular portion 44 to the other side end portion 48 opposing to the one side end portion 46, is equal to the dimension T2 from the one side end portion 50 of the inner rectangular portion 44 positioned close to the outer rectangular portion 42 to the other side end portion 52 opposing to the one side end portion 50 (T1=T2).

Further, in the same manner as the paper damper 30 in accordance with the embodiment mentioned above, the dimension T1 from the one side end portion 46 of the outer rectangular portion 42 positioned close to the inner rectangular portion 44 to the other side end portion 48 opposing to the one side end portion 46, and the dimension T2 from the one side end portion 50 of the inner rectangular portion 44 positioned close to the outer rectangular portion 42 to the other side end portion 52 opposing to the one side end portion 50 are set integral multiples such as one-fold, twofold or the like of the inner peripheral length of the first propeller shaft 10.

In accordance with the paper damper 62 of the modified embodiment, it is possible to form the outer paper portion 42 and the inner paper portion 44 as shown by the paper damper 30 in accordance with the embodiment mentioned above, in both of the case of being wound from the other side end portion 52 of the inner rectangular portion 44 as shown in FIG. 5, and the case of being wound from the one side end portion 54 in the axial direction of the outer rectangular portion 42 as shown in FIG. 6. Accordingly, it is possible to improve workability at a time of winding the paper damper 62 so as to accommodate in the inner portion of the first propeller shaft 10.

Further, it is set such that the dimension T1 from the one side end portion 46 of the outer rectangular portion 42 positioned close to the inner rectangular portion 44 to the other side end portion 48 opposing to the one side end portion 46 is equal to the dimension T2 from the one side end portion 50 of the inner rectangular portion 44 positioned close to the outer rectangular portion 42 to the other side end portion 52 opposing to the one side end portion 50 (T1=T2), it is possible to improve a stock utilization by die cutting while inverting the paper damper 62 up and down, at a time of manufacturing the paper damper. Further, in the case that two paper dampers are installed in both sides of one dynamic damper, extending directions of the respective paper dampers from the outer paper portion to the dynamic damper side are different, however, it is possible to easily manufacture a different specification by die cutting while inverting the paper damper up and down.

As mentioned above, in accordance with the present invention, when the paper damper comes into contact with the dynamic damper, the outer paper portion of the paper damper first comes into contact with the ring-like member of the dynamic damper. At this time, the outer paper portion and the inner paper portion of the paper damper do not come into contact with the weight member of the dynamic damper. Accordingly, the paper damper does not come into contact with the weight member of the dynamic damper, and it is possible to prevent the paper damper from adversely affecting the frequency characteristic of the dynamic damper. Particularly, since it is not necessary to make the ring-like member of the dynamic damper extend in the axial direction, it is possible to make the dynamic damper compact and light, and it is possible to prevent the manufacturing cost from being increased.

Further, in accordance with the present invention, it is set such that the dimension from the one side end portion positioned in the inner rectangular portion side of the outer rectangular portion constructing the outer paper portion of the paper damper to the other side end portion opposing to the one side end portion, and the dimension from the one side end portion positioned in the outer rectangular portion side of the inner rectangular portion constructing the inner paper portion of the paper damper to the other side end portion opposing to the one side end portion are integral multiples of the inner peripheral length of the shaft member. In other words, for example, if they are set such as to be twofold of the inner peripheral length of the shaft member, the outer rectangular portion and the inner rectangular portion are wound at two circles so as to be accommodated in the shaft member. Further, if they are set such as to be threefold of the inner peripheral length of the shaft member, the outer rectangular portion and the inner rectangular portion are wound at three circles so as to be accommodated in the shaft member. Accordingly, it is possible to restrain the dispersion of the mass of the paper damper over the circumferential direction of the shaft member in a state in which the paper damper is wound to be accommodated in the shaft member. As a result, it is possible to improve the sound damping performance of the stuffy sound generated by the paper damper as well as it is possible to prevent from adversely affecting the frequency characteristic of the dynamic damper.

Further, in accordance with the present invention, it is set such that the dimension from the one side end portion positioned in the inner rectangular portion side of the outer rectangular portion constructing the outer paper portion of the paper damper to the other side end portion opposing to the one side end portion is approximately equal to the dimension from the one side end portion positioned in the outer rectangular portion side of the inner rectangular portion constructing the inner paper portion of the paper damper to the other side end portion opposing to the one side end portion. Accordingly, it is possible to improve the stock utilization by die cutting while inverting the paper damper up and down, at a time of manufacturing the paper damper.

Further, it is possible to use the inner rectangular portion as the outer paper portion and use the outer rectangular portion as the inner paper portion, by appropriately inverting the paper damper in a vertical direction. As a result, it is possible to improve the workability at a time of winding the paper damper so as to accommodate in the inner portion of the shaft member.

Further, in the case that two paper dampers are installed in both sides of one dynamic damper, the extending directions of the respective paper dampers from the outer paper portion to the dynamic damper side are different, however, it is possible to easily manufacture the different specification by die cutting while inverting the paper damper up and down.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A propeller shaft accommodating a dynamic damper and a tubular wound paper damper in an inner portion of a shaft member,
    wherein said dynamic damper has a ring member positioned in an outer side in a diametrical direction, and a weight member positioned in an inner side in the diametrical direction of said ring member so as to be elastically retained,
    wherein said paper damper has an outer paper portion positioned in the outer side in the diametrical direction and an inner paper portion positioned in the inner side in the diametrical direction of said outer paper portion, in a state of being accommodated in said shaft member,
    wherein said outer paper portion is dimensioned longer so as to extend to said dynamic damper farther than said inner paper portion, and
    wherein said outer paper portion comes into contact with said ring member, whereby said inner paper portion is inhibited from coming into contact with said weight member.

2. A propeller shaft according to claim 1, wherein said paper damper has an outer rectangular portion constructing said outer paper portion and formed rectangular as a whole in a state of expanding said paper damper, and an inner rectangular portion constructing said inner paper portion, formed continuously with said outer rectangular portion in a state of expanding said paper damper and formed rectangular as a whole,
    wherein a dimension from one side end portion of said outer rectangular portion positioned close to said inner rectangular portion to the other side end portion opposing to said one side end portion, and a dimension from one side end portion of said inner rectangular portion positioned close to said outer rectangular portion to the other side end portion opposing to said one side end portion are approximately integral multiples of an inner peripheral length of said shaft member.

3. A propeller shaft according to claim 1, wherein said paper damper has an outer rectangular portion constructing said outer paper portion and formed rectangular as a whole in a state of expanding said paper damper, and an inner rectangular portion constructing said inner paper portion, formed continuously with said outer rectangular portion in a state of expanding said paper damper and formed rectangular as a whole,
    wherein a dimension from one side end portion of said outer rectangular portion positioned close to said inner rectangular portion to the other side end portion opposing to said one side end portion is approximately equal to a dimension from one side end portion of said inner rectangular portion positioned close to said outer rectangular portion to the other side end portion opposing to said one side end portion.

4. A propeller shaft according to claim 2, wherein a dimension from one side end portion of said outer rectangular portion positioned close to said inner rectangular portion to the other side end portion opposing to said one side end portion is approximately equal to an inner peripheral length of said shaft member, and
    wherein a dimension from one side end portion of said inner rectangular portion positioned close to said outer rectangular portion to the other side end portion opposing to said one side end portion is approximately twofold of an inner peripheral length of said shaft member.

5. A propeller shaft according to claim 1, wherein said paper damper is constructed by a core paper of a corrugated board.

6. A propeller shaft according to claim 2, wherein said paper damper is constructed by a core paper of a corrugated board.

7. A propeller shaft according to claim 3, wherein said paper damper is constructed by a core paper of a corrugated board.

8. A propeller shaft according to claim 4, wherein said paper damper is constructed by a core paper of a corrugated board.

* * * * *